US010896011B2

(12) United States Patent
Fernandes et al.

(10) Patent No.: US 10,896,011 B2
(45) Date of Patent: Jan. 19, 2021

(54) MOBILE DEVICE FOR AUTOMATICALLY DELIVERING PRINT JOBS TO PRINTERS

(71) Applicant: HEWLETT-PACKARD DEVELOPMENT COMPANY, L.P., Houston, TX (US)

(72) Inventors: Lenin Fernandes, Bangalore (IN); Kumaravel Ganesan, Bangalore (IN); Rajesh Bhatia, Bangalore (IN); Ritesh Jha, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 480 days.

(21) Appl. No.: 14/913,462

(22) PCT Filed: Aug. 23, 2013

(86) PCT No.: PCT/US2013/056380
§ 371 (c)(1),
(2) Date: Feb. 22, 2016

(87) PCT Pub. No.: WO2016/114744
PCT Pub. Date: Jul. 21, 2016

(65) Prior Publication Data
US 2016/0224284 A1    Aug. 4, 2016

(51) Int. Cl.
*G06F 3/12*    (2006.01)

(52) U.S. Cl.
CPC .......... *G06F 3/1231* (2013.01); *G06F 3/1204* (2013.01); *G06F 3/1236* (2013.01); *G06F 3/1271* (2013.01); *G06F 3/1286* (2013.01); *G06F 3/1287* (2013.01); *G06F 3/1292* (2013.01); *G06F 3/122* (2013.01)

(58) Field of Classification Search
CPC .... G06F 3/1231; G06F 3/1236; G06F 3/1204; G06F 3/1271; G06F 3/1286; G06F 3/1287; G06F 3/1292; G06F 3/122
USPC ................................................. 358/1.14, 1.15
See application file for complete search history.

(56) References Cited

U.S. PATENT DOCUMENTS

| 7,065,497 | B1 | 6/2006 | Brewster et al. |
| 2009/0033976 | A1* | 2/2009 | Ding ..................... G06F 3/1288 358/1.15 |
| 2009/0273801 | A1 | 11/2009 | Steele et al. |

(Continued)

FOREIGN PATENT DOCUMENTS

| EP | 1280049 | 1/2003 |
| EP | 2365431 | 2/2011 |
| EP | 2413234 A2 | 2/2012 |

OTHER PUBLICATIONS

Xerox® Mobile Print Cloud Information Assurance Disclosure, (Research Paper),Sep. 2012, http://www.xerox.com/download/security/information-assurance/183c14-4ced91118ad1.

*Primary Examiner* — Juan M Guillermety
(74) *Attorney, Agent, or Firm* — HP Inc. Patent Department

(57) ABSTRACT

Examples disclosed herein provide for the handling of a print job for a printer via a mobile device. The mobile device receives a notification from a computing device to indicate the print job is available for printing. Upon the mobile device joining a wireless network associated with the printer, the mobile device delivers the print job from the mobile device to the printer via the wireless network.

15 Claims, 7 Drawing Sheets

(56) References Cited

U.S. PATENT DOCUMENTS

| | | | |
|---|---|---|---|
| 2009/0323112 A1* | 12/2009 | Kamei | G06F 3/1204 358/1.15 |
| 2010/0002262 A1* | 1/2010 | Kondo | G06F 3/1208 358/1.15 |
| 2010/0309510 A1* | 12/2010 | Hansen | G06F 3/1203 358/1.15 |
| 2011/0066685 A1* | 3/2011 | Kitada | H04L 51/08 709/206 |
| 2011/0216349 A1* | 9/2011 | McCorkindale | G06F 15/00 358/1.15 |
| 2012/0026536 A1 | 2/2012 | Shah | |
| 2012/0057193 A1 | 3/2012 | Jazayeri et al. | |
| 2012/0140285 A1* | 6/2012 | Kamath | G06F 3/1287 358/1.15 |
| 2012/0300251 A1 | 11/2012 | St. Laurent et al. | |
| 2013/0031187 A1* | 1/2013 | Rajesh | H04L 12/1822 709/206 |
| 2013/0050741 A1* | 2/2013 | Raja | G06F 3/1204 358/1.15 |
| 2013/0077127 A1* | 3/2013 | Bhatia | G06F 3/1288 358/1.15 |
| 2013/0094047 A1 | 4/2013 | Bailey et al. | |
| 2013/0100484 A1* | 4/2013 | Hankins | G06F 3/1288 358/1.15 |
| 2013/0107312 A1 | 5/2013 | Venkatesh | |
| 2013/0246923 A1* | 9/2013 | Iwai | G06F 3/1292 715/736 |
| 2014/0085663 A1* | 3/2014 | Kavanappillil | G06F 3/1203 358/1.15 |
| 2014/0114782 A1* | 4/2014 | Cloin | G06F 3/1292 705/24 |
| 2014/0204403 A1* | 7/2014 | Young | G06F 3/1289 358/1.15 |
| 2014/0240756 A1* | 8/2014 | Ganesan | G06F 3/1292 358/1.15 |

* cited by examiner

MOBILE DEVICE FOR AUTOMATICALLY DELIVERING PRINT JOBS TO PRINTERS

BACKGROUND

Various solutions are available for connecting a printer to a network such as a local area network (LAN). Examples for connecting a printer to a LAN include using a printer with networking capabilities built in (e.g., network-enabled printer), or attaching a printer to a separate network endpoint, such as a print server connected to the LAN. As an example, a network-enabled printer may connect to a LAN over either Wi-Fi or Ethernet. Upon connecting the printer to the LAN, users of client devices connected to the LAN may be able to connect with the network-connected printer, and utilize features of the printer, such as submit a print job.

Portable client devices have substantially gained in popularity, particularly with the ability to communicate with other portable devices via a network, such as the Internet. Portable or mobile client devices include, for example, notebook computers, smartphones, and tablets. Such portable or mobile devices may be wirelessly coupled to a LAN. As a result, users of such devices, while coupled to the LAN, may wirelessly submit a print job to a printer that is also coupled to the LAN.

DRAWINGS

FIG. 1 illustrates a scenario of a mobile device functioning as an intermediary between a non-web-connected printer and the Internet, according to one example;

FIGS. 2A-B illustrate a scenario for a mobile device to automatically deliver a print job to a non-web-connected printer upon coming within proximity of the printer, according to one example;

DETAILED DESCRIPTION

Introduction

Figure 1:
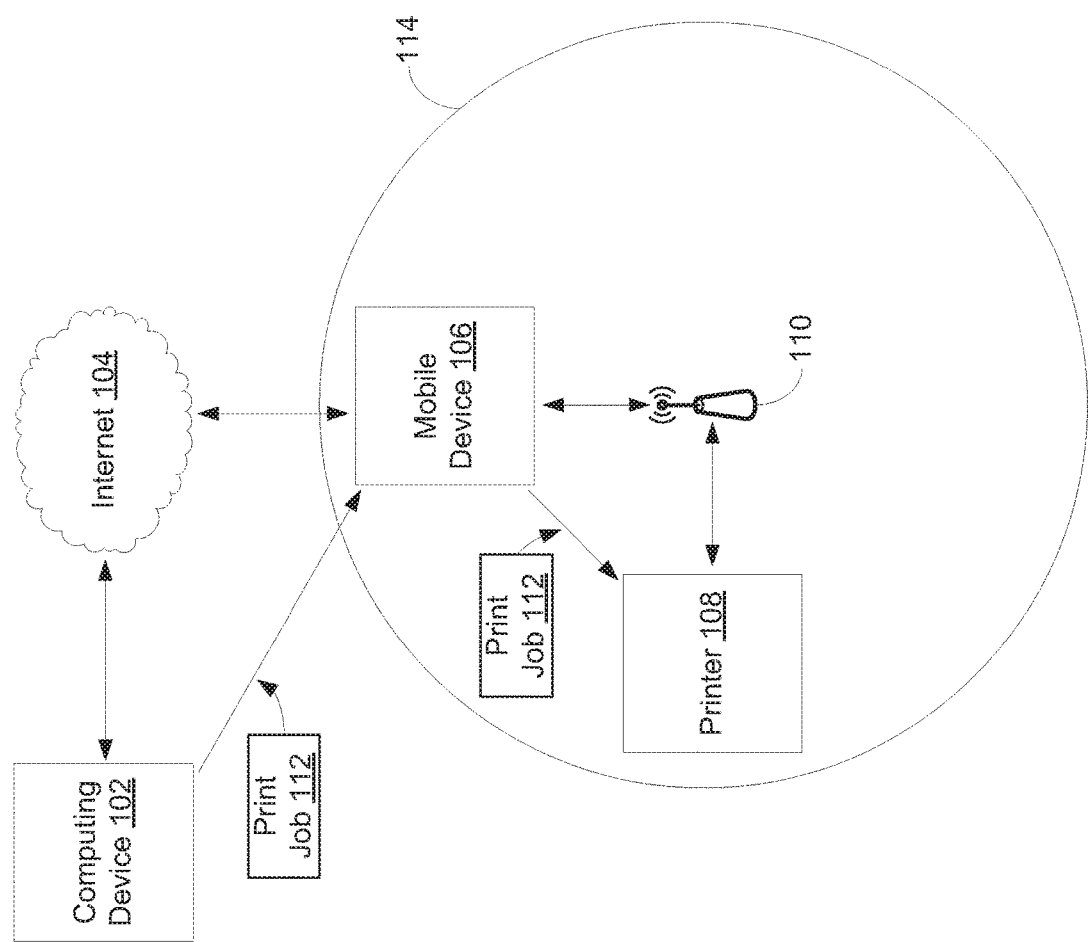

Web-connected printers are network-connected printers coupled to a LAN that are capable of receiving communications and printable content via the Internet without receiving the printable content from a client device coupled to the LAN. As an example, a job-sending computing device may send a print job to a cloud-based printing service, with the cloud-based service in turn sending the print job over the Internet to the web-connected printer. As a result, the print job may be transmitted to the web-connected printer and printed by the web-connected printer, all without any user intervention.

Examples of print jobs that may be sent over the Internet include, but are not limited to, scheduled content delivery and print jobs sent to an email address registered to the web-connected printer. With regards to scheduled content delivery, a user may have the ability to subscribe for content to be delivered at a scheduled time (e.g., every morning at 7 a.m.), and the content may be automatically delivered to the web-connected printer at the scheduled time over the Internet via the cloud-based service. With an email address registered to a web-connected printer, a print job may be submitted by emailing a document to the email address, and the cloud-based service may deliver the document to web-connected printer over the Internet. As a result, a user may be able to deliver a print job to a printer located in a different geographical location.

Non-web-connected printers are network-connected printers coupled to a LAN that are not capable of receiving communications and printable content via the Internet. Rather, non-web-connected printers may receive printable content from a client device coupled to the LAN over either Wi-Fi or Ethernet.

Examples disclosed herein provide the ability for a non-web-connected printer to function as a web-connected printer via a mobile client device that is capable of receiving communications via the Internet. By registering the mobile device as a proxy printer to receive printable content via the Internet, the mobile device may receive one or more print jobs to send to the non-web-connected printer upon coming within proximity of the non-web-connected printer. As an example, the mobile device may come within proximity of the non-web-connected printer upon joining a wireless network (e.g., Wi-Fi network) associated with the non-web-connected printer (Wi-Fi proximity). Upon joining the wireless network associated with the non-web-connected printer, the mobile device may automatically deliver the print jobs to the non-web-connected printer without further user input or intervention. With the mobile device functioning as an intermediary or bridge between the non-web-connected printer and the Internet, the non-web-connected printer may receive communications and printable content via the Internet.

As used herein, the term "cloud" is defined as including, but not limited to, computing resources (hardware, software, and firmware) that are delivered as a service over a network (such as the Internet). As used herein, the term "network" is defined as including, but not limited to, one or more connections between devices, systems, servers, applications and/or users that allow transfer and exchange of data and information. Networks may be wired and/or wireless, and utilize a variety of different topologies, transmission media, and protocols.

As used herein, a "printer" or "printing device" refers to any liquid inkjet printer, solid toner-based printer, liquid toner-based printer, or any other electronic device that prints. "Printer" or "printing device" includes any multi-functional electronic device that performs a function such as scanning and/or copying in addition to printing.

As used herein, a "print job" or "job" refers to content and/or instructions as to formatting and presentation of the content sent to a computer system for printing. A print job may be stored in a programming language and/or numerical form so that it can be stored and used in computing devices, servers, printers and other machines capable of performing calculations and manipulating data.

The following description is broken into sections. The first, labeled "Illustrative Examples," presents example scenarios of a mobile device functioning as a proxy printer. The second section, labeled "Components," describes examples of various physical and logical components for implementing various embodiments. The third section, labeled as "Operation," describes steps taken to implement various embodiments.

Illustrative Example

FIG. 1 illustrates an example scenario of a mobile device 106 functioning as an intermediary between a non-web-connected printer 108 and the Internet 104. As an example, the mobile device 106 may be registered with a job-sending computing device 102 to receive communications and printable content (e.g., print job 112) via the Internet 104. Upon the mobile device 106 coming within proximity of the non-web-connected printer 108, such as joining a wireless network 110 associated with the printer 108, the mobile device 106 may automatically deliver print job 112 wirelessly to the non-web-connected printer 108 for printing, as will be further described.

Computing device 102 represents generally any computing device or group of computing devices configured to send and receive network requests, send and receive data, and/or otherwise communicate with the mobile device 106 via the Internet 104. As used herein, "computing device" may be a print server, server, computer networking device, chip set, desktop computer, notebook computer, workstation, or any other processing device or equipment.

The mobile device 106 represents generally a smartphone, tablet computer, notebook computer, or any other mobile computing device configured to send and receive network requests, send and receive data, and/or otherwise communicate with the computing device 102 via the Internet 104. The mobile device 106 may communicate with the computing device 102 via the Internet 104 using a wireless or mobile communications technology, such as Wi-Fi, 3G, or 4G.

As an example, the mobile device 106 may register with the job-sending computing device 102 using a unique identifier, such as a media access control (MAC) address of the mobile device 106. As an example, a database may be stored on the computing device 102 for storing the unique MAC addresses for mobile devices registered to receive communications and printable content from the computing device 102. Upon registering with the computing device 102, a unique address, such as an email address, may be assigned by the computing device 102 to the mobile device 106 for handling print jobs designated for the mobile device 106. As a result, content may be delivered to respective mobile devices, according to their unique address. Examples of printable content that may be sent over the Internet include, but are not limited to, scheduled content delivery and documents sent as attachments to the email address registered to the mobile device 106.

As an example, the mobile device 106 may register with the job-sending device 102 using an application stored on the device 106. For example, a user of the mobile device 106 may download and install the application in order to register the mobile device 106 with the computing device 102. As another example, the user of the mobile device 106 may register with the computing device 102 by accessing a web portal using an Internet browser stored on the device 106.

While registering the mobile device 106 with the job-sending computing device 102, the mobile device 106 may discover non-web-connected printers that are within proximity of the mobile device 106. As an example, the application stored on the device 106 may display a list of one or more printers on the same wireless network as the mobile device 106. Referring to FIG. 1, mobile device 106 may discover and select non-web-connected printer 108, which is on the same Wi-Fi network 110 as the mobile device 106. Upon selection, the printer 108 may be registered with the mobile device 106 as a default printer (static association) for printing print jobs received from the job-sending computing device 102 (e.g., print job 112). A unique identifier may be assigned to the printer 108, to differentiate from other non-web-connected printers. An example of the unique identifier may include the serial number of the printer 108.

When associating the printer 108 with the mobile device 106, the mobile device 106 may obtain capabilities of the printer 108 and send them to the computing device 102. As an example, the capabilities of the printer 108 may be obtained through a networking protocol over the Wi-Fi network 110, such as Internet printing protocol (IPP). These capabilities may be uploaded to the database stored on the computing device 102. The computing device 102 may use these capabilities for processing and rendering print jobs designated for the printer 108. Examples of capabilities that may be uploaded to the database include, but are not limited to, whether the printer 108 is a color or monochrome printer, supported paper sizes, and rendering capabilities. For example, certain printers may be have capabilities for rendering print jobs themselves, but other printers may require for print jobs to be rendered, for example, by the computing device 102, prior to printing.

Figure 2A:
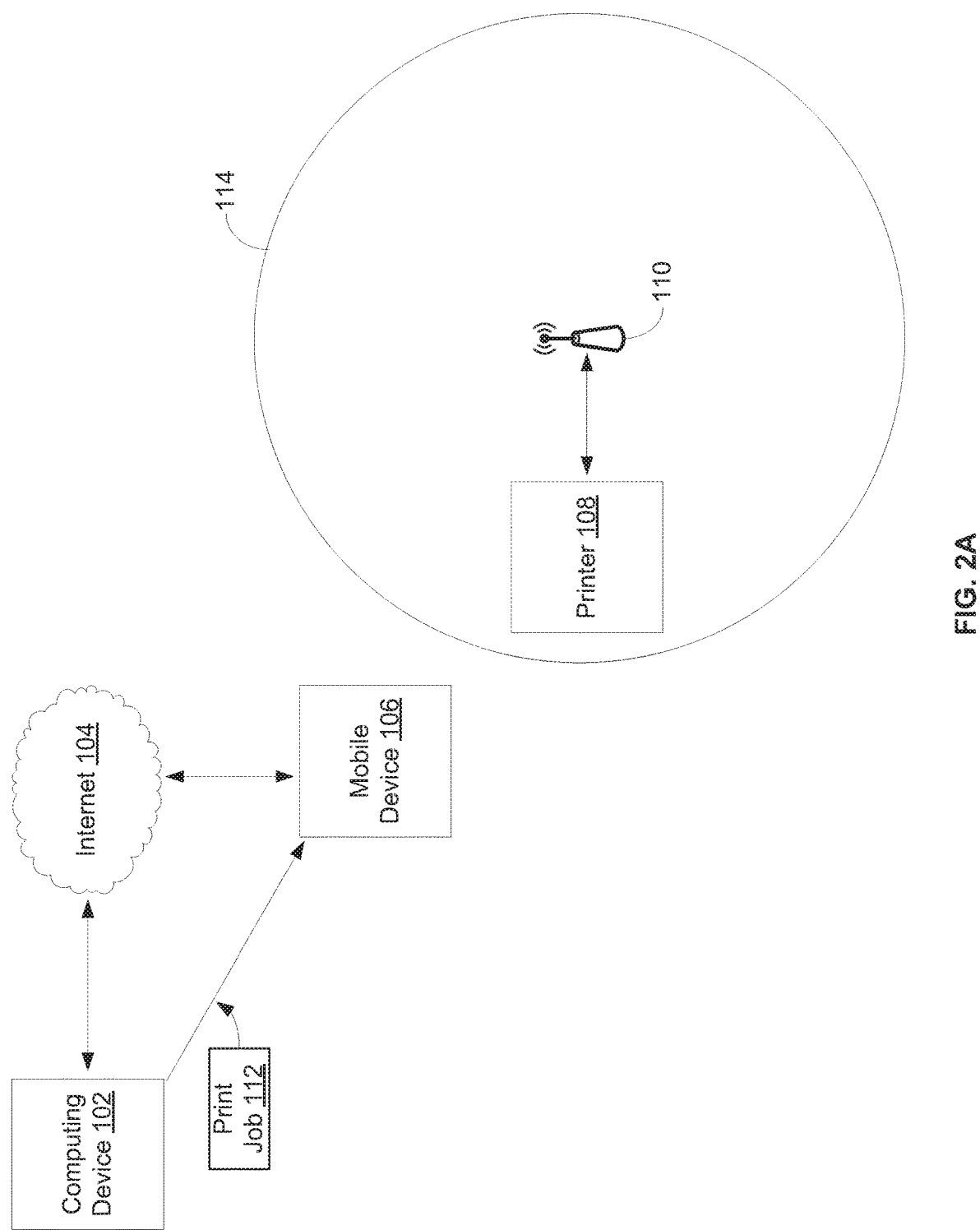
Figure 2B:
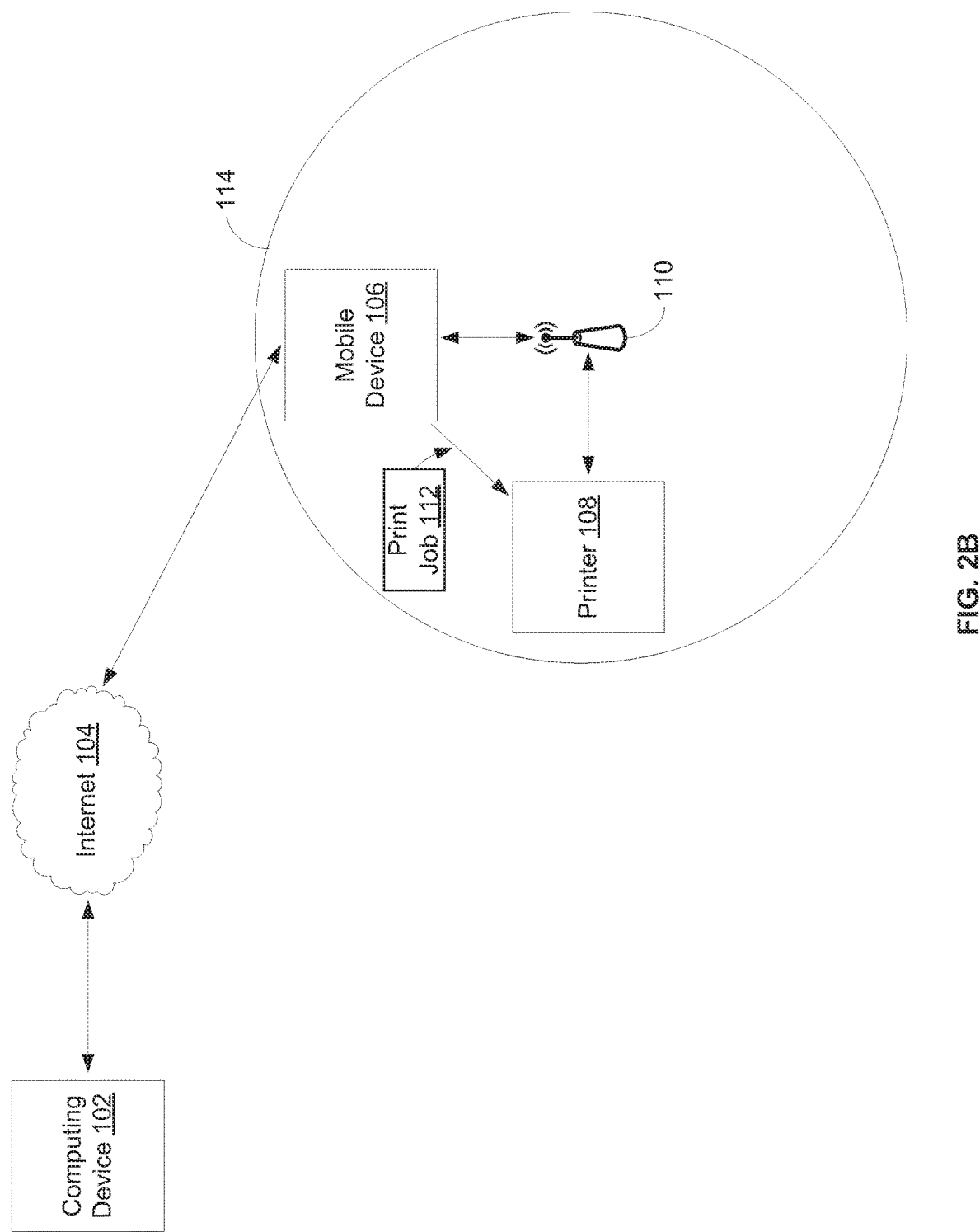

FIGS. 2A-B illustrate an example scenario for a mobile device 106 to automatically deliver a print job 112 to a non-web-connected printer 108 upon coming within proximity of the printer 108. The mobile device 106 may be registered with the computing device 102 to receive communications and printable content via the Internet 104, as described above. In addition, non-web-connected printer 108 may be statically associated with the mobile device 106 as a default printer for printing print jobs received from the job-sending computing device 102 (e.g., print job 112). The mobile device 106 may communicate with the computing device 102 via the Internet 104 using a wireless or mobile communications technology, such as Wi-Fi, 3G, or 4G.

Referring to FIG. 2A, the mobile device 106 may receive a notification from the computing device 102 that the print job 112 is available for printing to the printer 108. The print job 112 may be processed and rendered by computing device 102 according to the capabilities of the printer 108 that are stored in the database of the computing device 102. As an example, the mobile device 106 may receive the notification via the application stored on the device 106. Upon receiving the notification, the user of the mobile device 106 may accept or reject whether the print job 112 should be printed to the printer 108.

When receiving the notification, the mobile device 106 may not be within proximity of the non-web connected printer 108. For example, mobile device 106 may not be on the same wireless network 110 as the printer 108, as illustrated in FIG. 2A. As an example, the user of the mobile device 106 may be in a different geographical location from the printer 108. As a result, the application stored on the device 106 may determine when the mobile device 106 comes within proximity of the printer 108, and then automatically deliver the print job 112 to the printer 108 without further user input or intervention.

Referring to FIG. 2B, upon the mobile device 106 joining the wireless network 110 associated with the printer 108, the print job 112 may be automatically delivered to the printer 108 for printing. As an example, the application may determine that printer 108 is associated with wireless network 110 by detecting the serial number of printer 108 upon the mobile device 106 joining the wireless network 110. Upon detecting the printer 108, the mobile device 106 may download print job 112 wirelessly from the computing device 102, and then automatically deliver the print job 112 to the printer 108. The application may use the protocol supported by the non-web-connected printer 108 for sending the print job 112 to the printer 108 for printing. As an example, if the mobile device 106 is already within proximity of the non-web-connected printer 108 when receiving the notification that the print job 112 is available for printing, the print job 112 may be automatically delivered to the printer 108 for printing, as described above.

As an example, mobile device 106 may be associated with a single non-web-connected printer 108, as illustrated in FIG. 1 (static association). As a result, when mobile device 106 receives print job notifications from computing device 102, the print jobs may be automatically delivered to the printer 108 by the mobile device 106 upon coming within Wi-Fi proximity of the printer 108. However, certain print jobs may not be supported by the printer 108. For example, if the printer 108 is a monochrome printer, printable content that includes color may not be supported, or may not print as expected. As an example, a user of the mobile device 106 may have the ability choose from a plurality of non-web-connected printers that are within Wi-Fi proximity of the device 106, based on the capabilities required for a particular print job (dynamic association).

Figure 3:
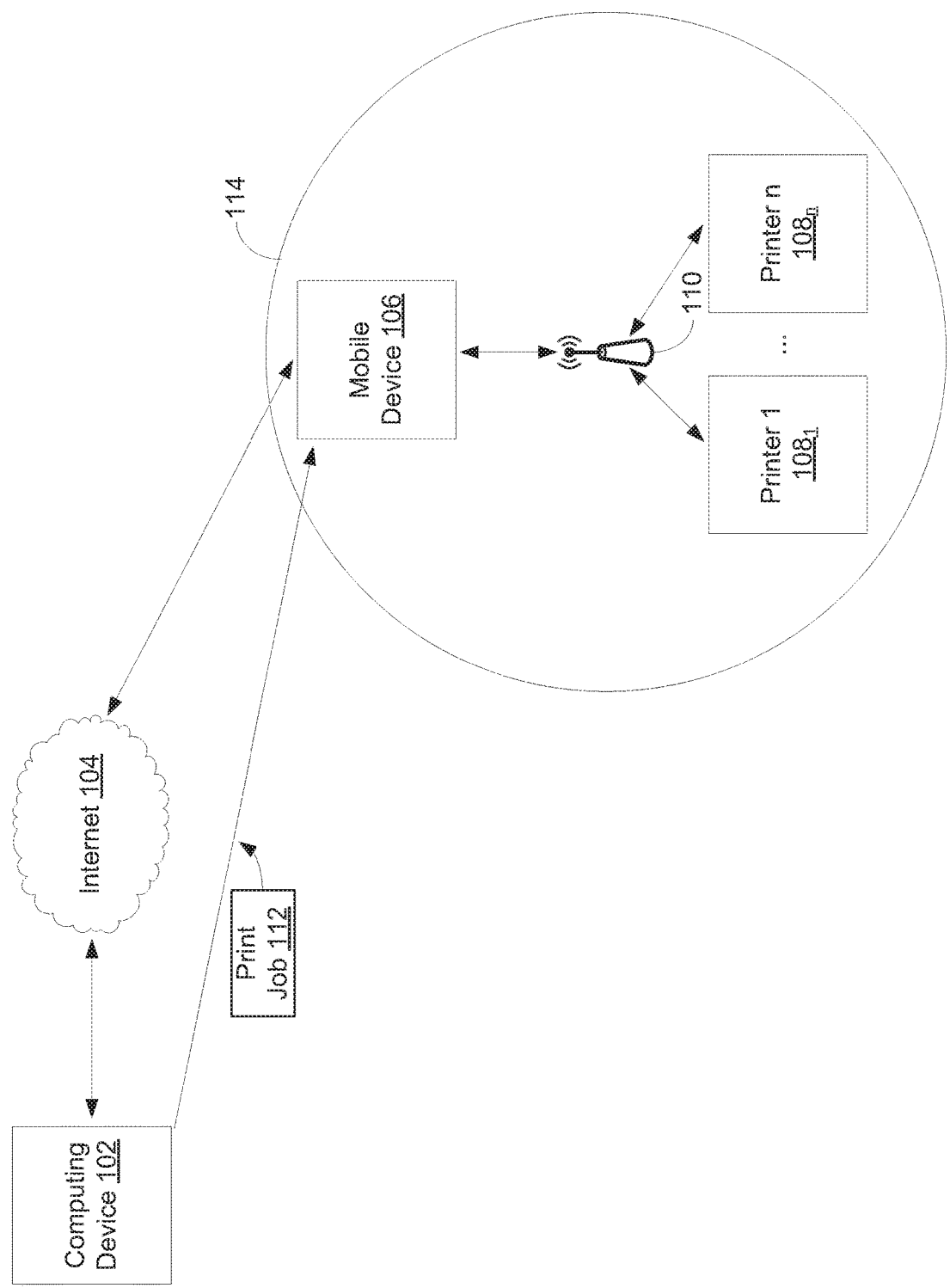
FIG. 3 illustrates a scenario for a mobile device to deliver a print job to a non-web-connected printer that is selected based on the capabilities required for printing the print job, according to one example.

FIG. 3 illustrates an example scenario for a mobile device 106 to deliver a print job 112 to a non-web-connected printer that is selected based on the capabilities required for printing the print job 112. The mobile device 106 may receive a notification from a job-sending computing device 102 that the print job 112 is available for printing. If a non-web-connected printer was selected by the mobile device 106 during registration, the print job 112 may be processed and rendered by the computing device 102 according to the selected printer. However, if a printer was not selected during registration, the computing device 102 may send the notification of the print job 112 to the mobile device 106, but process and render the print job 112 only after a printer is selected by the mobile device 106.

As an example, the mobile device 106 may receive the notification of the print job 112 via the application stored on the device 106. Upon receiving the notification, the user of the mobile device 106 may be able to determine the capabilities required for the print job 112. For example, the user, via the application stored on the device 106, may find information about the print job, such as whether the printable content includes color, or the paper size required for printing the print job. Based on the capabilities required for printing the print job 112, the user may select a printer from printer 1 $108_1$ to printer n $108_n$.

As an example, the application stored on the device 106 may display a list of printers on the same wireless network as the mobile device 106 (printer 1 $108_1$ to printer n $108_n$). Upon selecting a printer from the list, the mobile device 106 may obtain capabilities of the printer and send them to the computing device 102 for processing and rendering the print job 112 according to the capabilities of the selected printer. Upon receiving a notification of the rendered print job 112, the mobile device 106 may downloaded the print job 112 wirelessly from the computing device 102, and then automatically deliver the print job 112 to the selected printer. The application may use the protocol supported by the selected printer for sending the print job 112 to the printer for printing.

As an example, the capabilities of the printer 108 may be obtained through a networking protocol over the Wi-Fi network 110, such as Internet printing protocol (IPP). These capabilities may be uploaded to the database stored on the computing device 102. The computing device 102 may use these capabilities for processing and rendering print jobs designated for the printer 108.

Components

Figure 4:
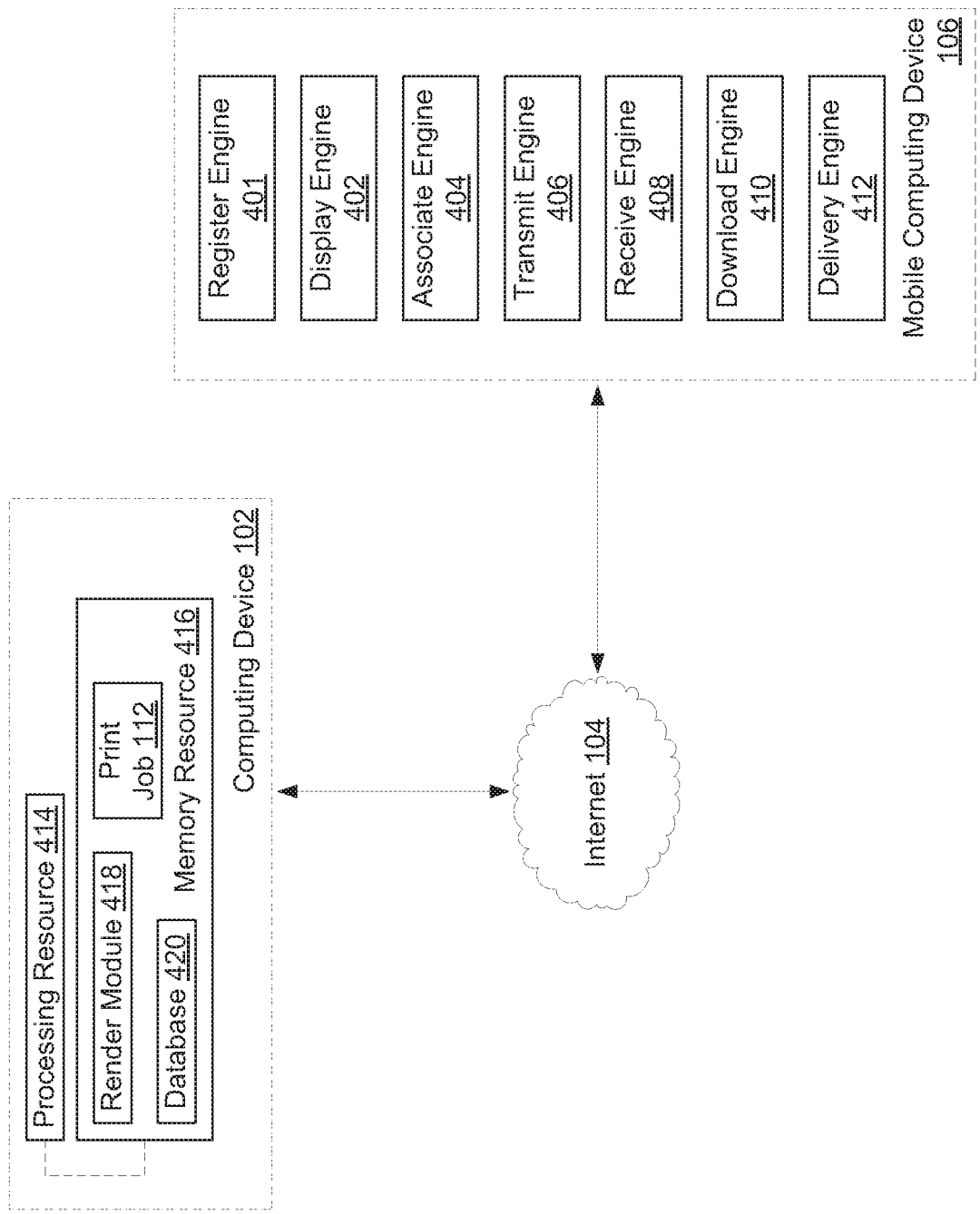
FIG. 4 is a block diagram depicting an example of components of a mobile device.
Figure 5:
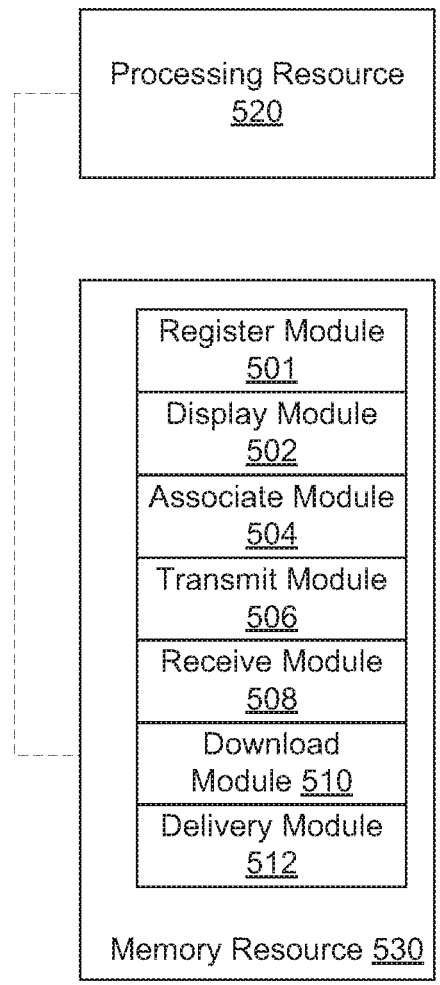
FIG. 5 is a block diagram depicting a memory resource and a processing resource, according to one example.

FIGS. 4-5 depict examples of physical and logical components for implementing various embodiments. In FIG. 4, various components are identified as engines 401-412. In describing engines 401-412, focus is on each engine's designated function. However, the term engine, as used herein, refers to a combination of hardware and programming configured to perform a designated function. As is illustrated later with respect to FIG. 5, the hardware of each engine, for example, may include one or both of a processor and a memory, while the programming is code stored on that memory and executable by the processor to perform the designated function. The programming can include an operating system and application. In addition, the hardware of each engine can include a display and any user input buttons.

FIG. 4 is a block diagram depicting components of a mobile device 106 communicating with a job-sending computing device 102 via the Internet 104, as an example. The mobile device 106 may communicate with the computing device 102 via the Internet 104 using a wireless or mobile communications technology, such as Wi-Fi, 3G, or 4G. The computing device 102 may include a memory resource 416 and a processing resource 414 for executing instructions stored on the memory resource 416.

In this example, the mobile device 106 includes register engine 401, display engine 402, associate engine 404, transmit engine 406, receive engine 408, download engine 410, and delivery engine 412. Register engine 401 represents a combination of hardware and programming configured to register the mobile device 106 with the computing device 102. As an example, the mobile device 106 may register with the computing device 102 using a unique identifier, such as a MAC address of the mobile device 106. As an example, the mobile device 106 may send the MAC address to be stored in a database 420 associated with the computing device 102. Upon registering with the computing device 102, a unique address, such as an email address, may be assigned by the computing device 102 to the mobile device 106 for handling print jobs designated for the mobile device 106.

Display engine 402 represents a combination of hardware and programming configured to display a list of one or more non-web-connected printers associated with a wireless network shared with the mobile device 106. Referring back to FIG. 1, an application stored on the mobile device 106 may display a list of one or more printers on the same wireless network as the device 106.

Associate engine 404 represents a combination of hardware and programming configured to associate a selected printer from the list with the mobile device 106 as a printer for printing print jobs received from the computing device 102. As described above, the mobile device 106 may be statically associated with the selected printer to print all print jobs received from the computing device 102. In addition, the mobile device 106 may be dynamically associated with a plurality of printers on the same wireless network as the device 106, based on the capabilities required to print a print job. Transmit engine 406 represents a combination of hardware and programming configured to send capabilities of the associated printer to be stored in the database 420 associated with the computing device 102.

Receive engine 408 represents a combination of hardware and programming configured to receive a notification from the job-sending computing device 102 to indicate a print job 112 is available for printing. Examples of the print job 112 include, but are not limited to, scheduled content delivery and documents sent as attachments to the email address assigned to the mobile device 106 during registration. As described above, the print job 112 may be processed and rendered by the computing device 102 according to the capabilities of the associated printer that are stored in the database 420 of the computing device 102. Upon searching the database 420, if the computing device 102 determines there is no printer associated with the mobile device 106, the computing device 102 may send the notification of the print job 112 to the mobile device 106, but process and render the print job 112 only after a printer is selected by the mobile device 106.

Download engine 410 represents a combination of hardware and programming configured to download the print job 112 wirelessly from the computing device 102. Referring back to FIG. 2B, the mobile device 106 may download the print job 112 upon joining the wireless network associated with the associated printer. Delivery engine 412 represents a combination of hardware and programming configured to automatically deliver the print job 112 wirelessly to the associated printer upon joining the wireless network associated with the printer.

In foregoing discussion, engines 401-412 were described as combinations of hardware and programming. Engines 401-412 may be implemented in a number of fashions. Looking at FIG. 5, the programming may be processor executable instructions stored on tangible memory resource 530 and the hardware may include processing resource 520 for executing those instructions. Thus, memory resource 530 can be said to store program instructions that when executed by processing resource 520 implement the components of the communications device of FIG. 4.

Memory resource 530 represents generally any umber of memory components capable of storing instructions that can be executed by processing resource 520. Memory resource 530 is non-transitory in the sense that it does not encompass a transitory signal but instead is made up of one or more memory components configured to store the relevant instructions. Memory resource 530 may be implemented in a single device or distributed across devices. Likewise, processing resource 520 represents any number of processors capable of executing instructions stored by memory resource 530. Processing resource 520 may be integrated in a single device or distributed across devices. Further, memory resource 530 may be fully or partially integrated in the same device as processing resource 520, or it may be separate but accessible to that device and processing resource 520.

In one example, the program instructions can be part of an installation package that when installed can be executed by processing resource 520 to implement the components of the communications device of FIG. 4. In this case, memory resource 530 may be a portable medium such as a CD, DVD, or flash drive or a memory maintained by a server from which the installation package can be downloaded and installed. In another example, the program instructions may be part of an application or applications already installed. Here, memory resource 530 can include integrated memory such as a hard drive, solid state drive, or the like.

In FIG. 5, the executable program instructions stored in memory resource 530 are depicted as register module 501, display module 502, associate module 504, transmit module 506, receive module 508, download module 510, and delivery module 512. Register module 501 represents program instructions that when executed cause processing resource 520 to implement register engine 401 of FIG. 4. Display module 502 represents program instructions that when executed cause the implementation of display engine 402. Associate module 504 represents program instructions that when executed cause the implementation of associate engine 404. Transmit module 506 represents program instructions that when executed cause the implementation of transmit engine 406. Receive module 508 represents program instructions that when executed cause the implementation of receive engine 408. Download module 510 represents program instructions that when executed cause the implementation of download engine 410. Likewise, delivery module 512 represents program instructions that when executed cause the implementation of delivery engine 412.

Operation

Figure 6:
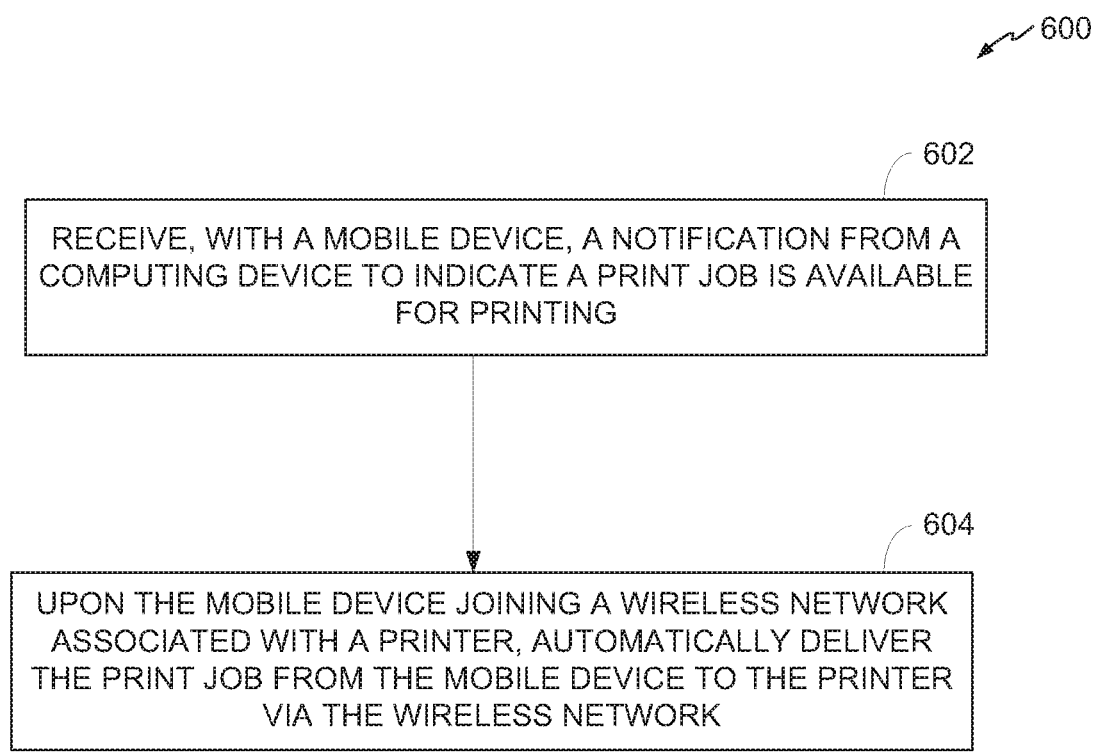
FIG. 6 is a flow diagram depicting steps to implement an example.

FIG. 6 is a flow diagram 600 of steps taken to implement a method for a mobile device handling a print job for a printer. In discussing FIG. 6, reference may be made to the example scenarios illustrated in FIGS. 1-3 and the components depicted in FIGS. 4-5. Such reference is made to provide contextual examples and not to limit the manner in which the method depicted by FIG. 6 may be implemented.

At 602, the mobile device may receive a notification from a computing device to indicate the print job is available for printing. Referring back to FIG. 4, receive engine 408 may be responsible for implementing step 602. As described above, the print job may be processed and rendered by the computing device according to the capabilities of a printer selected by the mobile device. The mobile device may be statically associated with the selected printer to print all print jobs received from the computing device. In addition, the mobile device may be dynamically associated with a plurality of printers, based on the capabilities required to print a print job.

Referring back to FIG. 2A, when receiving the notification, the mobile device 106 may not be within proximity of the selected printer (e.g., non-web connected printer 108). For example, mobile device 106 may not be on the same wireless network 110 as the printer 108. As an example, the user of the mobile device 106 may be in a different geographical location from the printer 108.

At 604, upon the mobile device joining a wireless network associated with the printer, the mobile device may automatically deliver the print job to the printer via the wireless network, as illustrated in FIG. 2B. Referring back to FIG. 4, delivery engine 412 may be responsible for implementing step 604 without further user intervention or input.

Conclusion

FIGS. 4-5 aid in depicting the architecture, functionality, and operation of various embodiments. In particular, FIGS. 4-5 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method to deliver a print job to a printer via a mobile device, the method comprising:
    joining, by the mobile device, a wireless network associated with the printer, wherein the printer is a non-web-connected printer; and
    upon and in response to the mobile device joining the wireless network associated with the printer,
        automatically downloading, at the mobile device, the print job from a computing device; and
        automatically delivering the print job from the mobile device to the printer via the wireless network to cause the printer to function as a web-connected printer to the computing device.

2. The method of claim 1, comprising:
    receiving, at the mobile device, a notification from the computing device to indicate that the print job is available for printing prior to downloading the print job from the computing device.

3. The method of claim 1, comprising:
    displaying, on the mobile device, a list of one or more printers associated with the wireless network;
    receiving, on the mobile device, a selection of the printer from the list;
    upon receipt of the selection of the printer from the list, registering the selected printer as a default printer for printing print jobs; and
    sending, from the mobile device, capabilities of the registered printer to the computing device to be stored in a database associated with the computing device.

4. The method of claim 3, wherein the print job is rendered by the computing device according to the capabilities of the registered printer retrieved from the database.

5. The method of claim 3, comprising:
    receiving, at the mobile device, a notification from the computing device for another print job available for printing;
    receiving, on the mobile device, a selection of another printer from the list;
    upon selection of the another printer from the list, sending, from the mobile device, capabilities of the another selected printer to the computing device, wherein the another print job is rendered by the computing device according to the capabilities of the other selected printer;
    receiving, at the mobile device, the rendered another print job from the computing device; and
    automatically delivering the rendered print job wirelessly from the mobile device to the another printer for printing.

6. A mobile device to deliver a print job to a printer, the mobile device comprising:
    a processor; and
    a memory on which is stored instructions that are to cause the processor to:
        register the mobile device with a computing device to receive printable content from the computing device via the Internet;
        join a wireless network associated with the printer, wherein the printer is non-web-connected printer; and
        upon and in response to joining the wireless network associated with the printer,
            download the print job from the computing device; and
            deliver, via the wireless network, the print job to the printer without user intervention to cause the printer to function as a web-connected printer to the computing device.

7. The mobile device of claim 6, wherein an email address is assigned by the computing device to the mobile device upon registration and wherein the instructions are further to cause the processor to receive the print job as a document emailed as an attachment to the email address.

8. The mobile device of claim 6, wherein the instructions are further to cause the processor to receive a notification from the computing device to indicate that the print job is available for printing prior to downloading the print job from the computing device.

9. The mobile device of claim 6, wherein the instructions are further to cause the processor to:
    display a list of one or more printers associated with the wireless network;
    received a selection of the printer from the list;
    upon receipt of the selection of the printer from the list, register the selected printer as a default printer for printing print jobs; and
    send capabilities of the registered printer to the computing device to be stored in a database associated with the computing device.

10. The mobile device of claim 9, wherein the print job is rendered by the computing device according to the capabilities of the registered printer retrieved from the database.

11. The mobile device of claim 9, wherein the instructions are further to cause the processor to:
    receive a notification from the computing device for another print job available for printing;
    receive a selection of another printer from the list;
    upon selection of the another printer from the list, send capabilities of the another selected printer to the computing device, wherein the another print job is rendered by the computing device according to the capabilities of the another selected printer;

receive the rendered another print job from the computing device; and automatically deliver the rendered another print job to the another printer for printing.

12. A non-transitory memory resource storing instructions that when executed cause a processor of a mobile device to deliver a print job of a computing device to a printer via a mobile device, wherein the instructions are to cause the processor to:

join a wireless network associated with the printer, wherein the printer is non-web-connected printer; and upon and in response to joining the wireless network associated with the printer, download the print job from the computing device; and automatically deliver the print job wirelessly to the printer for printing to cause the printer to function as a web-connected printer to the computing device.

13. The non-transitory memory resource of claim 12, wherein the instructions are further to cause the processor to:

receive a notification from the computing device to indicate that the print job is available for printing prior to downloading the print job from the computing device.

14. The non-transitory memory resource of claim 12, wherein the instructions are further to cause the processor to:

display a list of one or more printers associated with the wireless network;

receiving a selection of the printer from the list;

upon the selection of the printer from the list, register the selected printer as a default printer for printing print jobs; and send capabilities of the registered printer to the computing device to be stored in a database associated with the computing device.

15. The non-transitory memory resource of claim 14, wherein the print job is rendered by the computing device according to the capabilities of the registered printer retrieved from the database.

* * * * *